US008688570B2

(12) United States Patent  (10) Patent No.: US 8,688,570 B2
Jones et al.  (45) Date of Patent: Apr. 1, 2014

(54) SYSTEM AND METHOD FOR PERFORMING PERSON-TO-PERSON FUNDS TRANSFERS VIA WIRELESS COMMUNICATIONS

(75) Inventors: Jessica U. Jones, West Sussex (GB); Lee J. Peart, Surrey (GB); Blayn W. Beenau, Peoria, AZ (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 500 days.

(21) Appl. No.: 11/741,170

(22) Filed: Apr. 27, 2007

(65) Prior Publication Data

US 2008/0270300 A1 Oct. 30, 2008

(51) Int. Cl.
*G06Q 40/00* (2012.01)
*G06K 5/00* (2006.01)

(52) U.S. Cl.
USPC .......................................... 705/39; 235/380

(58) Field of Classification Search
USPC ...................... 705/35–45; 235/380
See application file for complete search history.

(56) References Cited

U.S. PATENT DOCUMENTS

| 5,796,832 | A | 8/1998 | Kawan | 380/24 |
| 5,949,044 | A | 9/1999 | Walker et al. | 235/379 |
| 5,991,749 | A | 11/1999 | Morrill, Jr. | 705/44 |
| 5,999,596 | A | 12/1999 | Walker et al. | 379/91.01 |
| 6,026,166 | A | 2/2000 | LeBourgeois | |
| 6,029,151 | A | 2/2000 | Nikander | 705/39 |
| 6,102,287 | A | 8/2000 | Matyas, Jr. | 235/380 |
| 6,169,890 | B1 | 1/2001 | Vatanen | |
| 6,227,447 | B1 | 5/2001 | Campisano | |
| 6,267,292 | B1 | 7/2001 | Walker et al. | 235/379 |

(Continued)

FOREIGN PATENT DOCUMENTS

| EP | 1280115 | 1/2003 |
| WO | 9834203 | 8/1998 |
| WO | 02054804 | 7/2002 |
| WO | 2008027620 | 3/2008 |

OTHER PUBLICATIONS

"Giesecke & Devrient and MasterCard International Launch World's first over the air personalization solution for mobile phone based payments", Business. New York: Apr. 5, 2006. p. 1.*

(Continued)

*Primary Examiner* — Mohammad Z Shaikh
(74) *Attorney, Agent, or Firm* — Snell & Wilmer L.L.P.

(57) ABSTRACT

A funds-transfer system includes a processor and a memory storing control logic for causing the processor to enable a buyer to transfer funds to a seller via a mobile telephone. The control logic includes program code for causing the processor to receive a payment request transmitted from a mobile telephone of the buyer. The payment request is for a transfer of funds from a financial account held by the buyer to a financial account held by the seller, and the payment request is transmitted from a payment application stored in the buyer's mobile telephone. The payment request identifies a purchase amount to be transferred, and information identifying the financial account held by the buyer. The control logic also includes program code for causing the processor to charge the purchase amount to the financial account held by the buyer and to transfer the purchase amount to a financial account held by the seller. Additionally, the control logic includes program code for causing the processor to provide a payment acknowledgment to the buyer's mobile telephone and to the seller.

33 Claims, 4 Drawing Sheets

(56) References Cited

U.S. PATENT DOCUMENTS

| | | | |
|---|---|---|---|
| 6,311,167 B1 | 10/2001 | Davis et al. | 705/35 |
| 6,327,348 B1 | 12/2001 | Walker et al. | 379/91.01 |
| 6,366,893 B2 | 4/2002 | Hannula et al. | 705/40 |
| 6,442,532 B1 | 8/2002 | Kawan | 705/35 |
| 6,456,984 B1 | 9/2002 | Demoff et al. | 705/40 |
| 6,597,770 B2 | 7/2003 | Walker et al. | 379/93.12 |
| 6,764,003 B1 | 7/2004 | Martschitsch et al. | 235/383 |
| 6,807,410 B1 | 10/2004 | Pailles et al. | 455/407 |
| 6,868,391 B1 | 3/2005 | Hultgren | 705/26 |
| 6,873,974 B1 | 3/2005 | Schutzer | 705/41 |
| 6,941,270 B1 | 9/2005 | Hannula | 705/1 |
| 6,988,657 B1 | 1/2006 | Singer et al. | 235/380 |
| 7,003,493 B2 | 2/2006 | Weichert et al. | 705/39 |
| 7,014,107 B2 | 3/2006 | Singer et al. | 235/380 |
| 7,014,109 B2 | 3/2006 | Hjelmvik | 235/382 |
| 7,024,174 B2* | 4/2006 | Nagy et al. | 455/408 |
| 7,031,939 B1 | 4/2006 | Gallagher et al. | 705/39 |
| 7,054,835 B2 | 5/2006 | Nanbu et al. | 705/26 |
| 7,089,208 B1 | 8/2006 | Levchin et al. | 705/39 |
| 7,096,003 B2 | 8/2006 | Joao et al. | 455/406 |
| 7,099,850 B1 | 8/2006 | Mann, II et al. | 705/64 |
| 7,103,576 B2 | 9/2006 | Mann, III et al. | 705/64 |
| 7,107,078 B2 | 9/2006 | Lehto | 455/566 |
| 7,107,250 B2 | 9/2006 | Harrison | 705/76 |
| 7,120,608 B1 | 10/2006 | Gallagher et al. | 705/68 |
| 7,124,937 B2 | 10/2006 | Myers et al. | 235/380 |
| 7,131,571 B2 | 11/2006 | Swift et al. | 235/375 |
| 7,136,836 B1 | 11/2006 | Washizuka et al. | 705/39 |
| 7,139,694 B2 | 11/2006 | Horn et al. | 703/69 |
| 7,146,342 B1 | 12/2006 | Angelin et al. | 705/76 |
| 7,152,782 B2 | 12/2006 | Shenker et al. | 235/380 |
| 7,239,226 B2 | 7/2007 | Berardi et al. | 340/5.61 |
| 7,249,112 B2 | 7/2007 | Berardi et al. | 705/79 |
| 7,945,240 B1* | 5/2011 | Klock et al. | 455/406 |
| 8,121,945 B2* | 2/2012 | Rackley et al. | 705/40 |
| 8,160,959 B2* | 4/2012 | Rackley et al. | 705/39 |
| 8,510,220 B2* | 8/2013 | Rackley et al. | 705/40 |
| 8,543,496 B2 | 9/2013 | Beenau et al. | |
| 2001/0037264 A1 | 11/2001 | Husemann et al. | |
| 2002/0004770 A1 | 1/2002 | Phillips et al. | |
| 2003/0022655 A1 | 1/2003 | Bogat | |
| 2003/0055785 A1 | 3/2003 | Lahiri | |
| 2003/0074328 A1 | 4/2003 | Schiff et al. | |
| 2003/0112783 A1 | 6/2003 | Rankin | |
| 2004/0030652 A1 | 2/2004 | Grunzig et al. | |
| 2004/0098350 A1* | 5/2004 | Labrou et al. | 705/64 |
| 2004/0107170 A1* | 6/2004 | Labrou et al. | 705/64 |
| 2004/0143545 A1* | 7/2004 | Kulakowski | 705/39 |
| 2004/0185830 A1 | 9/2004 | Joao et al. | |
| 2005/0027543 A1* | 2/2005 | Labrou et al. | 705/1 |
| 2005/0038736 A1 | 2/2005 | Saunders | 705/39 |
| 2005/0049974 A1 | 3/2005 | Jani et al. | |
| 2005/0086164 A1* | 4/2005 | Kim et al. | 705/40 |
| 2005/0187873 A1* | 8/2005 | Labrou et al. | 705/40 |
| 2005/0187882 A1 | 8/2005 | Sovio et al. | |
| 2005/0246181 A1 | 11/2005 | Kawahara | |
| 2005/0250538 A1* | 11/2005 | Narasimhan et al. | 455/558 |
| 2006/0018450 A1 | 1/2006 | Sandberg-Diment | |
| 2006/0080232 A1 | 4/2006 | Epps | |
| 2006/0116892 A1* | 6/2006 | Grimes et al. | 705/1 |
| 2006/0122921 A1 | 6/2006 | Comerford et al. | |
| 2006/0144932 A1 | 7/2006 | Bendeck et al. | |
| 2006/0163349 A1 | 7/2006 | Neugebauer | |
| 2006/0235758 A1 | 10/2006 | Schleicher | |
| 2006/0258397 A1 | 11/2006 | Kaplan et al. | |
| 2006/0278704 A1 | 12/2006 | Saunders et al. | |
| 2006/0287004 A1 | 12/2006 | Fuqua | |
| 2007/0001001 A1* | 1/2007 | Myers et al. | 235/380 |
| 2007/0106558 A1* | 5/2007 | Mitchell et al. | 705/16 |
| 2007/0130025 A1 | 6/2007 | Nakajima | |
| 2007/0187491 A1* | 8/2007 | Godwin et al. | 235/380 |
| 2007/0192245 A1 | 8/2007 | Fisher et al. | |
| 2007/0215696 A1 | 9/2007 | Macnish | |
| 2007/0226051 A1 | 9/2007 | Addepalli et al. | |
| 2007/0233615 A1* | 10/2007 | Tumminaro | 705/75 |
| 2007/0244811 A1* | 10/2007 | Tumminaro | 705/39 |
| 2007/0255620 A1* | 11/2007 | Tumminaro et al. | 705/14 |
| 2007/0255652 A1* | 11/2007 | Tumminaro et al. | 705/39 |
| 2007/0255653 A1* | 11/2007 | Tumminaro et al. | 705/39 |
| 2007/0255662 A1* | 11/2007 | Tumminaro | 705/79 |
| 2007/0262134 A1 | 11/2007 | Humphrey et al. | |
| 2007/0262139 A1* | 11/2007 | Fiebiger et al. | 235/380 |
| 2008/0006685 A1* | 1/2008 | Rackley, III et al. | 235/379 |
| 2008/0010190 A1* | 1/2008 | Rackley, III et al. | 705/39 |
| 2008/0010191 A1* | 1/2008 | Rackley, III et al. | 705/39 |
| 2008/0010192 A1* | 1/2008 | Rackley, III et al. | 705/39 |
| 2008/0010193 A1* | 1/2008 | Rackley, III et al. | 705/39 |
| 2008/0010196 A1* | 1/2008 | Rackley, III et al. | 705/40 |
| 2008/0010204 A1* | 1/2008 | Rackley, III et al. | 705/45 |
| 2008/0046366 A1* | 2/2008 | Bemmel et al. | 705/44 |
| 2008/0155257 A1 | 6/2008 | Werner et al. | |
| 2008/0201212 A1 | 8/2008 | Hammad et al. | |
| 2008/0255993 A1 | 10/2008 | Blinbaum | |
| 2011/0191280 A1 | 8/2011 | Takahashi | |

OTHER PUBLICATIONS

Ross, Snel, "Swedish Bank Starts Offering Services by Cell Phone", American Banker. New York, N.Y.: Oct. 11, 1999, vol. 164, iss. 195; pp. 1-2.*

Ortolani, Alex; "Cashing in Where Cash Is King; Chinese Cellphone Providers Develop Mobile Payment Systems", Asian Wall Street Journal [Victoria, Hong Kong], Jan. 24, 2005, pp. 1-2.*

Boyd, John, "Here comes the Wallet Phone: Japan's DoCoMo gets ready to put your money where your mouth is", IEEE Spectrum, Nov. 2005, pp. 1-3.*

Merell, C, "Spanish Steps [mobile payments]", Financial World, Sep. 2003, pp. 21-24, 26.*

Jerry Gao, Ph.D., Jackey Cai, Kiran Patel, Simon Shim, Ph.D., "A Wireless Payment System", San Jose State University, Computer Engineering, San Jose U.S.A, Proceedings of the Second International Conference on Embedded Software and Systems (ICESS '05).*

Jerry Gao, Ph.D., Krishnaveni, Edunuru, Jackey Cai, Kiran Patel, Simon Shim, Ph.D., "P2-Paid: A Peer-to-Peer Wireless Payment System", San Jose State University, Computer Engineering, San Jose U.S.A, Proceedings of the 2005 Second IEEE International Workshop on Mobile Commerce and Services (WMCS'05).*

Herzberg, Amir, "Payments and Banking with Mobile Personal Devices", Communications of the ACM, May 2003/vol. 46. No. 5, pp. 53-58.*

"Giesecke & Devrient and MasterCard International Launch World's First Over-the-Air Personalization Solution for Mobile Phone-Based Payments", Business Wire. New York: Apr. 5, 2006, pp. 1-3.*

"Mobile banking on the move at last", Retailer Bank International (London ed.). London: Mar. 2006, pp. 1-2.*

Eazel, William, "PayPal intros SMS Payments", vunet.com Mar. 24, 2006, http://www.vunet.com/articles/print/2152694, pp. 1-2.* viVOtech, Inc., "RF-Based Contactless Payment: White Paper, " Apr. 2006.

http://www.vivotech.com/, "Contactless & NFC Mobile Phone Payments," unknown publication date, downloaded Oct. 11, 2007.

http://www.ti.com/rfid/shtml/apps-contactless.shtml, "Ti-RFid™ & Contactless Commerce,"unknown publication date, downloaded Oct. 11, 2007.

"A Cash Call—Smart Cards and mobile phones are quickly emerging as ways to pay with electronic cash", The Economist, Feb. 17, 2007.

International Search Report and Written Opinion of the International Searching Authority, PCT/US08/60970, Aug. 13, 2008.

USPTO; Office Action dated Aug. 6, 2008 in U.S. Appl. No. 11/741,243.

USPTO; Final Office Action dated Feb. 3, 2009 in U.S. Appl. No. 11/741,243.

USPTO; Advisory Action dated May 20, 2009 in U.S. Appl. No. 11/741,243.

USPTO; Office Action dated Jun. 17, 2009 in U.S. Appl. No. 11/741,243.

USPTO; Office Action dated Sep. 18, 2009 in U.S. Appl. No. 11/741,243.

(56) References Cited

OTHER PUBLICATIONS

USPTO; Final Office Action dated Mar. 26, 2010 in U.S. Appl. No. 11/741,243.
USPTO; Advisory Action dated Jun. 7, 2010 in U.S. Appl. No. 11/741,243.
USPTO; Office Action dated Dec. 11, 2009 in U.S. Appl. No. 11/741,288.
USPTO; Final Office Action dated Jun. 23, 2010 in U.S. Appl. No. 11/741,288.
USPTO; Advisory Action dated Aug. 30, 2010 in U.S. Appl. No. 11/741,288.
USPTO; Office Action dated Oct. 8, 2010 in U.S. Appl. No. 11/741,288.
USPTO; Final Office Action dated Mar. 11, 2011 in U.S. Appl. No. 11/741,288.
"Top of Our Radar: Next Generation Mobile Phone with Tap & Go TM Payment in New York City", M2 Presswire. Coventry. Dec. 15, 2006. p. 1.
MasterCard and VeriFone Announce First Ever Tap & Go TM payments in Taxis, Business Wire. New York: Nov. 15, 2006.
USPTO; Office Action dated Jun. 11, 2008 in U.S. Appl. No. 11/741,268.
USPTO; Final Office Action dated Dec. 12, 2008 in U.S. Appl. No. 11/741,268.
USPTO; Office Action dated Apr. 1, 2009 in U.S. Appl. No. 11/741,268.
USPTO; Final Office Action dated Nov. 9, 2009 in U.S. Appl. No. 11/741,268.
USPTO; Office Action dated Feb. 5, 2010 in U.S. Appl. No. 11/741,268.
USPTO; Office Action dated Jul. 22, 2010 in U.S. Appl. No. 11/741,268.
USPTO; Final Office Action dated Dec. 21, 2010 in U.S. Appl. No. 11/741,268.
USPTO; Advisory Action dated Mar. 3, 2011 in U.S. Appl. No. 11/741,268.
PCT; International Search Report and Written Opinion dated Jul. 1, 2008 in Application No. PCT/US2008/061604.
PCT; International Preliminary Report on Patentability dated Oct. 27, 2009 in Application No. PCT/US2008/061604.
PCT; International Search Report and Written Opinion dated Aug. 29, 2008 in Application No. PCT/US2008/060972.
PCT; International Preliminary Report on Patentability dated Oct. 27, 2009 in Application No. PCT/US2008/060972.
"News Digest: Nokia launches mobile payment NFC handset", Electronic Payments International. London: Jan. 2007. p. 4.
PCT; International Preliminary Report on Patentability dated Oct. 27, 2009 in Application No. PCT/US2008/060970.
PCT; International Search Report and Written Opinion dated in Application No. PCT/US2008/061602.
PCT; International Preliminary Report on Patentability dated Oct. 27, 2009 in Application No. PCT/US2008/061602.
AU; Examination Report dated Jan. 18, 2011 in Application No. 2008245878.
EP; European Search Report dated Mar. 22, 2011 in Application No. 08746398.0.
EP; European Search Report dated Mar. 22, 2011 in Application No. 08746400.4.
Australian Exam Report dated Aug. 17, 2012 in Application No. 2008245668.
Mexican Office Action received Sep. 25, 2012 in Application No. MX/a/2009/011630.
EP; European Examination Report received Dec. 13, 2011 in Application No. 08746398.0.
AU; Examination Report dated Dec. 19, 2011 in Application No. 2008245878.
EP; European Supplemental Search Report received Dec. 22, 2011 in Application No. 08746926.8.
AU; Examination Report dated Jan. 25, 2012 in Application No. 2008245668.
AU; Examination Report dated Jan. 25, 2012 in Application No. 2008245880.
AU; Examination Report dated Sep. 7, 2011 in Application No. 2008245878.
Office Action dated May 30, 2012 in Canadian Application No. 2,685,414.
Mexican Office Action received Jun. 8, 2012 in Application No. MX/a/2009/011633.
Mexican Office Action received Jun. 7, 2012 in Application No. MX/a/2009/011631.
USPTO; Final Office Action dated Mar. 29, 2012 in U.S. Appl. No. 11/741,288.
USPTO; Advisory Action dated May 24, 2012 in U.S. Appl. No. 11/741,288.
MX; Mexican Office Action dated Mar. 2012 in Application No. MX/a/2009/011630.
USPTO; Advisory Action dated May 23, 2011 in U.S. Appl. No. 11/741,288.
USPTO; Office Action dated Sep. 15, 2011 in U.S. Appl. No. 11/741,288.
AU; Examination Report dated Jun. 20, 2011 in Application No. 2008245878.
AU; Examination Report dated Mar. 3, 2011 in Application No. 2008245666.
EP; European Search Report dated Jun. 23, 2011 in Application No. 08746927.6.
USPTO; Office Action dated Apr. 8, 2013 in U.S. Appl. No. 11/741,288.
Examination Report dated Apr. 9, 2013 in European Application No. 08746927.6.
Mexican Office Action received Apr. 16, 2013 in Application No. MX/a/2009/011631.
Mexican Office Action received Apr. 17, 2013 in Application No. MX/a/2009/011633.
Mexican Office Action received May 7, 2013 in Application No. MX/a/2009/011630.
USPTO; Office Action dated Apr. 25, 2013 in U.S. Appl. No. 11/741,243.
USPTO; Office Action dated Jan. 7, 2013 in U.S. Appl. No. 11/741,268.
USPTO; Notice of Allowance dated Sep. 3, 2013 in U.S. Appl. No. 11/741,288.
USPTO; Final Office Action dated Sep. 24, 2013 in U.S. Appl. No. 11/741,243.
USPTO; Notice of Allowance dated Jun. 5, 2013 in U.S. Appl. No. 11/741,268.
Examination Report dated Jun. 11, 2013 in European Application No. 08746400.4.

* cited by examiner

SYSTEM AND METHOD FOR PERFORMING PERSON-TO-PERSON FUNDS TRANSFERS VIA WIRELESS COMMUNICATIONS

RELATED APPLICATIONS

The following applications, each of which is incorporated herein by reference, were filed concurrently with the present application and include subject matter that is related to the subject matter of the present application: U.S. application Ser. No. 11/741,288 entitled "Payment Application Download to Mobile Phone"; U.S. application Ser. No. 11/741,243 entitled "Mobile Payment System and Method"; and U.S. application Ser. No. 11/741,268 entitled "User Experience on Mobile Phone".

BACKGROUND OF THE INVENTION

1. Field of the Invention

The present invention generally relates to a system and a method for wirelessly transferring funds from one financial transaction account to another financial transaction account. More particularly, the present invention relates to a system and a method for enabling an account holder of a financial transaction account to transfer funds to a financial transaction account of another account holder, via wireless communications, during a person-to-person interaction between the account holders.

2. Related Art

Consumers very often use financial transaction instruments as convenient forms of payment for purchases of goods and/or services ("goods/services") instead of using cash or checks. Traditionally, a "financial transaction instrument" is embodied as a card-shaped device, also referred to herein as a "card," and may be any of the following: a traditional "plastic" transaction card (e.g., a credit card, a charge card, a debit card, a pre-paid or stored-value card, or the like); a titanium-containing, or other metal-containing, transaction card; a clear or translucent transaction card; a foldable or otherwise unconventionally-sized transaction card; or any other type of card used in connection with a financial transaction.

It is common for financial transaction instruments to be shaped as cards that fit in a wallet, to make them convenient for consumers to carry one or more when traveling or performing day-to-day activities outside their homes. Many consumers regularly carry several such cards at a time, with each card corresponding to a different financial transaction account. This sometimes causes a great deal of inconvenience, especially when each of the several cards must be searched in order to find a particular card to be used for a financial transaction (e.g., when a merchant only accepts an American Express® card for the transaction). Also, when a consumer carries several cards at a time, the consumer may misplace or lose one of the cards and not become aware of the missing card until the next time the card is to be used, which may not be for days or weeks or longer. If it turns out that the missing card was stolen and then used for fraudulent purchases, both the card issuer and the consumer can suffer monetary losses. Therefore, there is a need for a convenient way for consumers to make purchases that does not require the use of a card. More generally, there is a need for a convenient way for a person to transfer funds to another person that does not require the use of cash, a check, or a card.

More recently, new types of financial transaction instruments, configured with electronic functionality, have become popular. Electronic circuitry is printed on or otherwise incorporated within these instruments for implementing financial transactions. One such instrument is a contactless transaction card, sometimes referred to as a "smart card." Contactless transaction cards may be equipped with electronic circuitry for wirelessly communicating data to and/or reading data from a card reader/writer, which reads data from or transfers data to such transaction cards. The wireless communication of data may occur via an electromagnetic transmission or other type of wireless transmission. Contactless transactions cards, however, present the same inconveniences and drawbacks as other cards, as discussed above. Another such instrument is a fob-type device shaped to dangle from a keychain, in which a wireless transponder and reader are incorporated in the device. Fob-type devices, however, tend to be bulky. Therefore, if a consumer carries several such devices on a keychain, it may be uncomfortable and/or unsightly for the consumer to keep the keychain in a clothing pocket, or it may require the consumer to use a larger handbag than otherwise would be necessary. Of course, if the several fob-devices are carried around loosely (i.e., not on a single keychain), then a similar drawback occurs as with cards. That is, a consumer may not becoming aware of a misplaced or lost device until the next time the device is to be used, which may not be for days or weeks or longer, and which may cause economic losses for the consumer and/or the device issuer if it turns out that the missing device was stolen and then used for fraudulent purchases. Therefore, there is a need for a convenient way for consumers to make purchases that does not require the use of a fob-type device. More generally, there is a need for a convenient way for a person to transfer funds to another person that does not require the use of cash, a check, or a fob-type device.

As used herein, a "financial transaction account," also referred to herein as a "transaction account," may be a bank account, a credit account, or the like. For example, a bank account may be a savings account, a checking account, a money-market account, or the like; and a credit account may be a transaction account associated with a pre-approved line of credit.

Also, as used herein, the term "merchant" refers to any person, entity, distributor system, software, and/or hardware that is a provider or broker of goods/services, and includes any other entity in the distribution chain of goods/services. For example, a typical merchant may be a grocery store, a retail store, a travel agency, a service provider, a public-service utility, a school, a library, an on-line merchant, a government agency, or the like. A non-typical merchant may be a host of a garage sale or a host of a fund-raising activity, for example.

Also, as used herein, the terms "consumers," "customers," and "users" may be used interchangeably to refer to persons who purchase goods/services from merchants.

In regard to use of a financial transaction account, a consumer may communicate or interact with a traditional merchant in person (e.g., at a store), telephonically, or electronically (e.g., from a computer via the Internet). During the interaction, the merchant may offer good/services to the customer. The merchant also may offer the customer an option to pay for the goods/services using any number of available transaction accounts via their corresponding financial transaction instruments.

Generally, a traditional merchant that wants to provide customers with the option to pay for goods/services with a particular type of financial transaction instrument will enter into an agreement with the issuer of that type of instrument (e.g., American Express®, Visa®, Discover®, MasterCard®, or the like). The issuer typically is a financial organization (e.g., American Express®, JPMorgan Chase, MBNA®, Citibank®, or the like).

Although financial transaction instruments (e.g., cards and fob-type devices) provide consumers with a convenient way to pay for purchases and also provide traditional merchants with a convenient way to obtain payment for purchases, non-traditional merchants generally cannot take advantage of the conveniences without an agreement with the issuers. In other words, a garage-sale host cannot accept payments by credit cards or debit cards without pre-established agreements with the issuer of those cards. Therefore, non-traditional merchants, such as street artists, garage-sale hosts, community fundraisers, and the like, must ask their customers to pay with cash or checks. This may reduce the number of sales and the sales revenue made by non-traditional merchants, because many consumers rely on the use of cards for purchases and do not routinely carry checks or a large amount of cash (i.e., an amount over about $20).

Given the foregoing, a need exists for a system that conveniently enables consumers to make purchases that does not require the use of a card or a fob-type device. More generally, there is a need for a system that enables a person to transfer funds directly to another person that does not require the use of cash, a check, a card, or a fob-type device.

BRIEF DESCRIPTION OF THE INVENTION

The present invention meets the above-identified need by providing a system, a method, and a computer program product that allows a person-to-person transfer of funds through use of wireless communications. The wireless communications take place via one or more mobile communication devices. Neither of the persons involved in the funds transfer is necessarily a traditional merchant, and no issuer-merchant agreement needs to be in place before the funds transfer takes place, as typically would be required before a merchant would be able to accept payment through a card issued by an issuer. Instead, the present invention enables funds to be transferred from a financial transaction account of a payer to a financial transaction account of a payee through wireless communications that occur between one or more mobile devices, such as a mobile telephone or the like.

An advantage of the present invention is that it allows an owner of a first card (sometimes referred to as a cardmember) to transfer funds to an owner of a second card by transferring funds directly from a financial transaction account corresponding to the first card to a financial transaction account corresponding to a second card. The issuer of the first card can be the same as the issuer of the second card, such as in a transfer of funds between two American Express® accounts, or the issuer of the first card can be different from the issuer of the second card. Thus, a cardmember can transfer funds, without the use of cash or checks, to another cardmember who is not a merchant or who is not authorized/equipped to receive funds via a card. More specifically, once an agreement is reached to transfer funds, a mobile device of the payee transmits information (e.g., account identification information, amount to be transferred, caller ID of the payee's mobile-device, etc.) to a mobile device of the payer, which uses the transmitted information in a funds-transfer request. The request is transmitted by the payer's mobile device to a transfer server, which determines whether the transfer is permitted and, if so, arranges for the funds to be transferred. The transfer server then causes a transfer acknowledgment to be sent to the payee's mobile device (or both the payer's and the payee's mobile devices) as a payment confirmation.

According to an embodiment of the present invention, a computer system is provided for enabling a buyer to transfer funds to a seller via a mobile telephone. The system includes a processor a memory storing control logic, and the control logic includes:

first computer-readable program code for causing the processor to receive a payment request transmitted from a mobile telephone of the buyer,
    wherein the payment request is for a transfer of funds from a financial account held by the buyer to a financial account held by the seller,
    wherein the payment request is transmitted from a payment application stored in the buyer's mobile telephone, and
    wherein the payment request identifies a purchase amount to be transferred, and information identifying the financial account held by the buyer;

second computer-readable program code for causing the processor to charge the purchase amount to the financial account held by the buyer and to transfer the purchase amount to a financial account held by the seller; and third computer-readable program code for causing the processor to provide a payment acknowledgment to the buyer's mobile telephone and to the seller.

According to another embodiment of the present invention, a computer system is provided for enabling a first party to transfer funds to a second party via a mobile telephone. The system includes a processor and a memory storing control logic. The control logic includes:

first computer-readable program code for causing the processor to receive a payment request transmitted from a mobile telephone of the first party,
    wherein the payment request is for a transfer of funds between a financial account held by the first party and a financial account held by the second party,
    wherein the payment request is transmitted from a payment application stored in the first party's mobile telephone, and
    wherein the payment request identifies a purchase amount to be transferred, information identifying the financial account of the first party, and information identifying the financial account of the second party;

second computer-readable program code for causing the processor to transfer the purchase amount between to the financial account held by the first party and the financial account held by the second party; and third computer-readable program code for causing the processor to provide a payment acknowledgment to the first's mobile telephone and to a communication device of the second party.

According to yet another embodiment of the present invention, a computer system is provided for enabling a first party to transfer funds to a second party via a mobile device. The system includes a processor and a memory storing control logic. The control logic includes:

first computer-readable program code for causing the processor to receive a payment request transmitted from a mobile device of the first party,
    wherein the payment request is for a transfer of funds between a financial account held by the first party and a financial account held by the second party,
    wherein the payment request is transmitted from a payment application stored in the first party's mobile device, and
    wherein the payment request identifies a purchase amount to be transferred, information identifying the financial account of the first party, and information identifying the financial account of the second party;

second computer-readable program code for causing the processor to transfer the purchase amount between to the financial account held by the first party and the financial account held by the second party; and third computer-readable program code for causing the processor to provide a payment acknowledgment to the first's mobile device and to a communication device of the second party.

According to still another embodiment of the present invention, a computer system is provided for enabling a buyer to transfer funds to a seller via a mobile telephone. The system includes a processor and a memory storing control logic. The control logic includes:

first computer-readable program code for causing the processor to download a payment application to a mobile telephone of the buyer upon a download request transmitted from the buyer's mobile telephone to the computer system,
wherein the downloaded payment application is personalized for the buyer in accordance with identification information transmitted from the buyer's mobile telephone to the computer system, and
wherein the downloaded payment application is stored in a memory of the buyer's mobile telephone;

second computer-readable program code for causing the processor to receive a payment request transmitted from the buyer's mobile telephone,
wherein the payment request is for a transfer of funds from a financial account held by the buyer to a financial account held by the seller, and
wherein the payment request is transmitted in accordance with the payment application and identifies a purchase amount to be transferred, a telephone number for a mobile telephone of the seller, and information identifying the financial account held by the buyer;

third computer-readable program code for causing the processor to charge the purchase amount to the financial account held by the buyer and to transfer the purchase amount to a financial account held by the seller; and fourth computer-readable program code for causing the processor to provide a payment acknowledgment to each of the buyer's mobile telephone and the seller's mobile telephone.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a system and a method for enabling a person-to-person transfer of funds through wireless communications involving at least one mobile device. The funds are transferred from a financial transaction account of the payer to a financial transaction account of a payee as payment for a face-to-face financial transaction between the payer and the payee. The transfer occurs in real time and, after completion of the transfer, a confirmation is transmitted to the payee. The present invention eliminates that need for a merchant to have specialized equipment (e.g., card readers for reading information from cards; RF transceivers for communicating with fob-type devices; read/write devices for reading and updating smart cards; and the like) to receive payment for a purchase, without the exchange of cash or checks. Further, because a financial institution is involved, the payee can be assured that the funds transfer took place and is not fraudulent.

II. System

Figure 1:
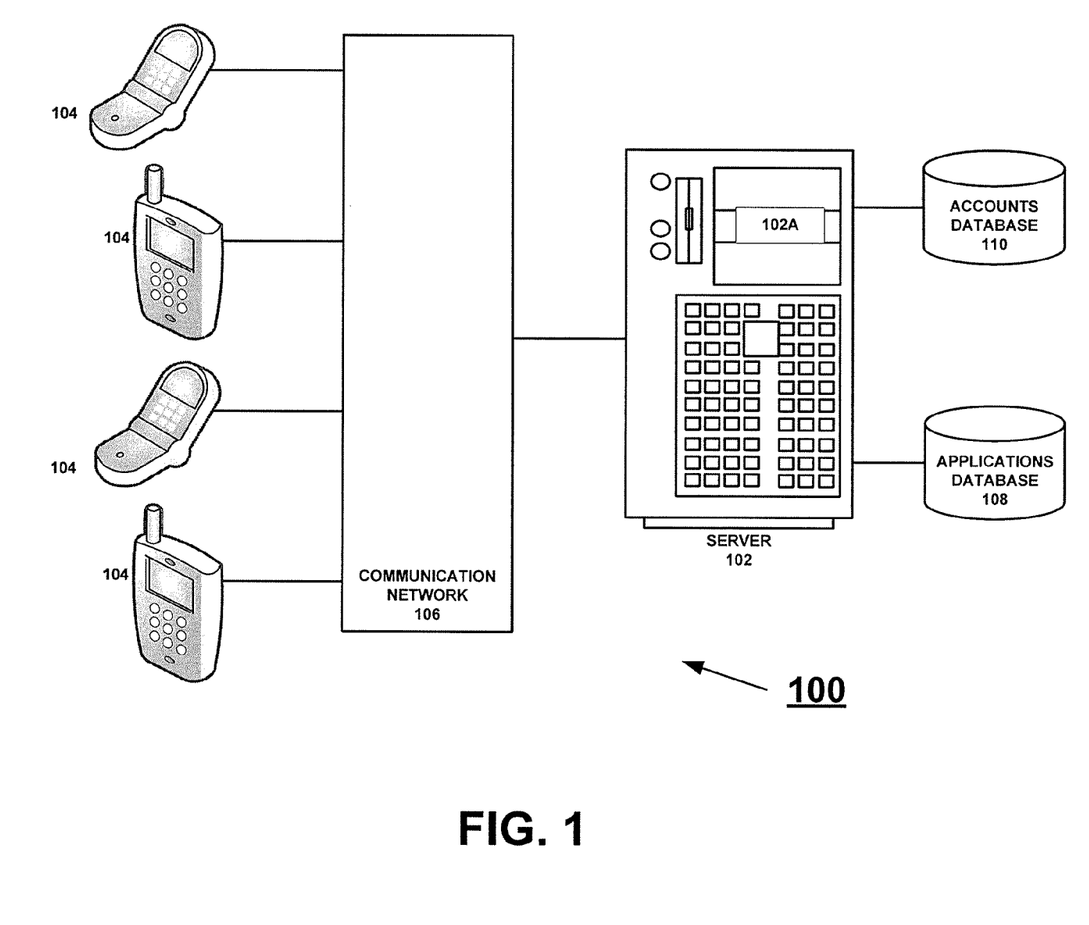
FIG. 1 schematically illustrates a system diagram of an exemplary funds-transfer system used to implement an embodiment of the present invention.

FIG. 1 shows a schematic system diagram of an exemplary funds-transfer system 100, used to implement or practice one or more embodiments of the present invention. Funds-transfer system 100 includes a transfer server 102 that is able to communicate with a plurality of mobile devices 104 via a communication network 106.

Transfer server 102 has access to a plurality of databases in/from which information is stored/retrieved, such as an applications database 108 and an accounts database 110, for example. Applications database 108 stores one or more applications that can be uploaded to (or downloaded by) mobile device 104 via a wireless transmission using communication network 106. Accounts database 110 stores information on transaction accounts. Transfer server 102 includes a Web hosting environment 102A, whose function is described in more detail below.

In an embodiment of the present invention, transfer server 102 is managed by an issuer (e.g., American Express®), and accounts database 110 stores information on transaction accounts of that issuer, such that funds may only be transferred between transaction accounts of that issuer.

In another embodiment of the present invention, transfer server 102 is managed by an issuer and is connected via a communication network (not shown) to another transfer server (not shown) managed by another issuer. This enables funds to be transferred between transaction accounts of different issuers.

Communication network 106 may be a cellular communication network, a satellite communication network, the Internet, or any other means of wireless communication between transfer server 102 and mobile device 104, and between different mobile devices 104. Mobile device 104 may be a mobile telephone, a personal digital assistant (e.g., a Blackberry®), a portable computer, or any other digital device able to perform wireless data communication with transfer server 102 or with another mobile device 104.

Mobile device 104 may be equipped with Bluetooth®, NFC ("near-field communication"), and/or infrared (e.g., IrDA) communication modules, which enables it to communicate wirelessly with other devices in its proximity or in its line of sight.

Optionally, to ensure security, communications may occur indirectly with transfer server 102 through a security filter (not shown) such as, for example, a firewall, which may be implemented with hardware, software, or a combination thereof. Other types of security measures may be employed, as will be appreciated by persons of skill in the relevant art(s).

According to an embodiment, applications database 108 includes applications created according to the J2ME platform established by Java®. For mobile devices 104 that are mobile telephones, the J2ME applications can be downloaded by (or uploaded to) the mobile telephones using known ".jad" and ".jar" technology.

Figure 2:
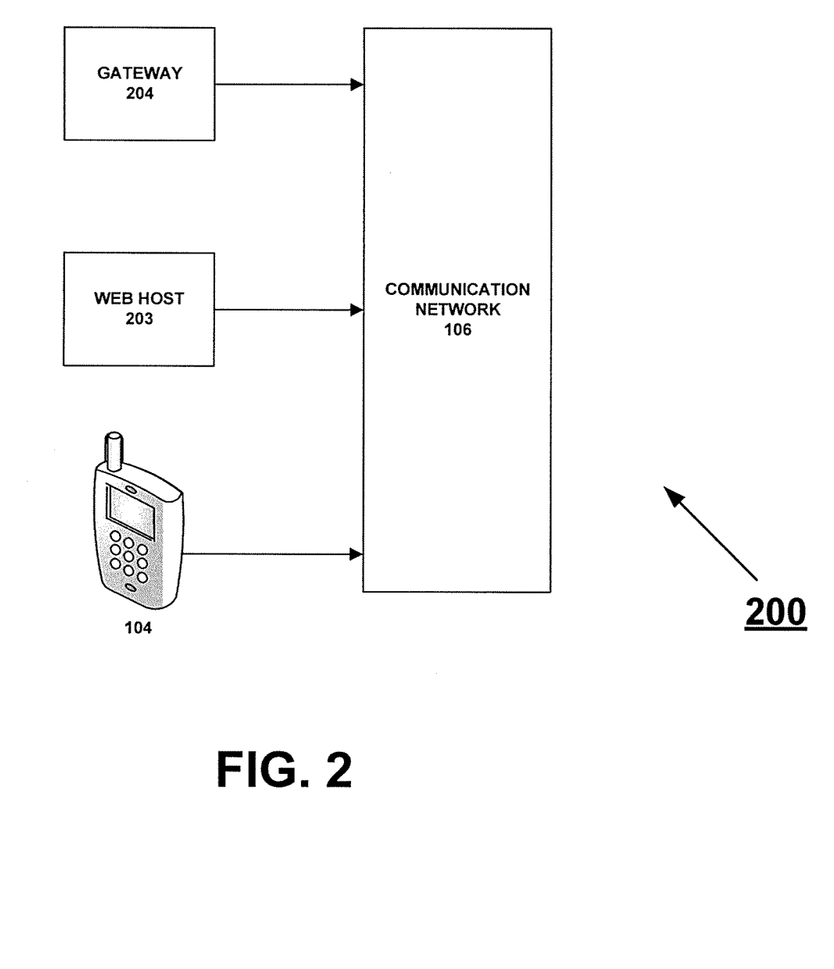
FIG. 2 schematically illustrates a system diagram of an exemplary application-installation system used to implement an embodiment of the present invention.

FIG. 2 shows a schematic system diagram for an application-installation system 200, which may be used to install a payment application on mobile device 104. The payment application is used to practice one or more embodiments of the present invention.

Application-installation system 200 includes mobile device 104, Web host 203, and a gateway 204. Web host 203 may be Web hosting environment 102A of transfer server 102, shown in FIG. 1, or may be an apparatus separate from transfer server 102. During installation of the payment application, gateway 204 sends a message to mobile device 104. The message may be sent using, for example, known push technology. The message includes a URL for a .jad file and requests a user of mobile device 104 to confirm that download of the payment application is desired. After the message is received by mobile device 104, the user confirms that download is desired by sending a reply to the message. The message and the reply may be, for example, SMS messages. The reply causes Web host 203 to use the URL to retrieve the .jad file, which then is sent to mobile device 104. The .jad file includes a URL for a .jar file.

As will be appreciated by persons skilled in the relevant art(s), a .jad file is a descriptor file for a .jar file. Because .jar files can be large, the purpose of the .jad file is to enable mobile device 104 to download a small .jad file initially, which contains detailed information on the content of the corresponding .jar file. The detailed information may include, for example, the source of the .jar file, the size of the .jar file, etc.

Mobile device 104 reads and executes the .jad file, which causes Web host 203 to download the .jar file to mobile device 104 based on the URL for the .jar filed included in .jad file. After the .jar file has been downloaded to the mobile device 104, the user is asked to confirm that download of the payment application is desired. When the user responds affirmatively to the request, Web host 203 retrieves the payment application (e.g., from a database of applications) and causes the payment application to download to mobile device 104.

IV. Exemplary Applications of the System

The following are examples of various ways funds-transfer system 100 may be utilized.

In an embodiment of the present invention, funds-transfer system 100 includes a processor and a memory storing control logic for causing the processor to enable a buyer to transfer funds to a seller via a mobile telephone. The control logic includes program code for causing the processor to receive a payment request transmitted from a mobile telephone of the buyer. The payment request is for a transfer of funds from a financial account held by the buyer to a financial account held by the seller, and the payment request is transmitted from a payment application stored in the buyer's mobile telephone. The payment request identifies a purchase amount to be transferred, and information identifying the financial account held by the buyer. The control logic also includes program code for causing the processor to charge the purchase amount to the financial account held by the buyer and to transfer the purchase amount to a financial account held by the seller. Additionally, the control logic includes program code for causing the processor to provide a payment acknowledgment to the buyer's mobile telephone and to the seller.

According to an aspect of the embodiment, the information identifying the financial account held by the seller is transmitted from a device controlled by the seller to the buyer's mobile telephone.

According to another aspect of the embodiment, the payment acknowledgment is provided to the device controlled by the seller, such as the seller's mobile telephone, for example.

According to another aspect of the embodiment, the payment application is uploaded to the buyer's mobile telephone when the computer system receives a request from the buyer's mobile telephone.

According to a further aspect of the embodiment, the payment request includes authentication information, which is used to authenticate the buyer. For example, the authentication information may be biometric information, a digital signature, a password, or any other information that can be used to authenticate the buyer.

In another embodiment of the present invention, funds-transfer system 100 includes a processor and a memory storing control logic for causing the processor to enable a first party to transfer funds to a second party via a mobile telephone. The control logic includes program code for causing the processor to receive a payment request transmitted from a mobile telephone of the first party. The payment request is for a transfer of funds between a financial account held by the first party and a financial account held by the second party, the payment request is transmitted from a payment application stored in the first party's mobile telephone, and the payment request identifies a purchase amount to be transferred, information identifying the financial account of the first party, and information identifying the financial account of the second party. The control logic also includes program code for causing the processor to transfer the purchase amount between to the financial account held by the first party and the financial account held by the second party. Additionally, the control logic includes program code for causing the processor to provide a payment acknowledgment to the first party's mobile telephone and to a communication device of the second party.

According to an aspect of the embodiment, the communication device of the second party is a mobile telephone, and the information identifying the financial account of the second party is transmitted from the second party's mobile telephone to the first party's mobile telephone. For example, the information may be transmitted according to any of the following protocols: Bluetooth®, NFC, and IrDA, According to another aspect of the embodiment, the first party is a payer and the second party is a payee.

According to another aspect of the embodiment, the first party is a payee and the second party is a payer.

According to a further aspect of the embodiment, the payment application is uploaded to the first party's mobile telephone when the computer system receives a request from the first party's mobile telephone.

In still another embodiment of the present invention, funds-transfer system 100 includes a processor and a memory storing control logic for causing the processor to enable a first party to transfer funds to a second party via a mobile device. The control logic includes program code for causing the processor to receive a payment request transmitted from a mobile device of the first party. The payment request is for a transfer of funds between a financial account held by the first party and a financial account held by the second party, the payment request is transmitted from a payment application stored in the first party's mobile device, and payment request identifies a purchase amount to be transferred, information identifying the financial account of the first party, and information identifying the financial account of the second party. The control logic also includes program code for causing the processor to transfer the purchase amount between to the financial account held by the first party and the financial account held by the second party. Additionally, the control logic includes program code for causing the processor to provide a payment acknowledgment to the first's mobile device and to a communication device of the second party.

According to an aspect of the embodiment, the buyer's mobile device is a mobile telephone or a wireless email device.

According to another aspect of the embodiment, the communication device of the second party is a mobile telephone or a wireless email device, and the information identifying the financial account of the second party is transmitted from the second party's communication device to the first party's mobile device.

According to yet another aspect of the embodiment, the first party is a payer and the second party is a payee.

According to a further aspect of the embodiment, the first party is a payee and the second party is a payer.

According to still another aspect of the embodiment, the payment application is uploaded to the first party's mobile device when the computer receives a request from the first party's mobile device.

In yet another embodiment of the present invention, funds-transfer system 100 includes a processor and a memory storing control logic stored therein for causing the processor to enable a buyer to transfer funds to a seller via a mobile telephone. The control logic includes program code for causing the processor to download a payment application to a mobile telephone of the buyer upon a download request transmitted from the buyer's mobile telephone to the computer system. The downloaded payment application is personalized for the buyer in accordance with identification information transmitted from the buyer's mobile telephone to the computer system, and the downloaded payment application is stored in a memory of the buyer's mobile telephone. The control logic also includes program code for causing the processor to receive a payment request transmitted from the buyer's mobile telephone. The payment request is for a transfer of funds from a financial account held by the buyer to a financial account held by the seller, and the payment request is transmitted in accordance with the payment application and identifies a purchase amount to be transferred, a telephone number for a mobile telephone of the seller, and information identifying the financial account held by the buyer. The control logic further includes program code for causing the processor to charge the purchase amount to the financial account held by the buyer and to transfer the purchase amount to a financial account held by the seller. Additionally, the control logic includes program code for causing the processor to provide a payment acknowledgment to each of the buyer's mobile telephone and the seller's mobile telephone.

According to an aspect of the embodiment, the telephone number of the seller's mobile telephone identifies the financial account held by the seller.

According to another aspect of the embodiment, the payment request identifies the financial account held by the seller.

According to a further aspect of the embodiment, the telephone number of the seller's mobile telephone is inputted to the payment program via a wireless transmission.

According to still another aspect of the embodiment, the telephone number of the seller's mobile telephone is manually inputted to the payment program using a keypad of the buyer's mobile telephone.

According to a further aspect of the embodiment, a security feature available to the user is the ability to set one or more transaction limits to the payment application and to store these limits in the memory of the phone. For example, the user can set a transaction limit of 5, whereby after every fifth transaction made using the payment application from the mobile phone, the next transaction requires affirmative reauthorization from the user, such as entry of the user's PIN. As another example, the user can set a transaction limit of 7 (or another selected number), and then set the phone to prompt the user after the fifth (or other ordinal) transaction that the transaction limit is being approached. The user can respond to the prompt with reauthorization after the fifth or sixth transaction, whereby after the seventh transaction, the user can make additional transactions without needing to provide further reauthorization. However, if the user ignores the prompt, then after the seventh transaction, further reauthorization is definitely required. Thus, the user can have security without the possible inconvenience of entering a PIN for every transaction. Also, through prompting the user for the PIN before authorization expires, there is a buffer period for reentry of the PIN (i.e., reauthorization). Therefore, if the user is in a hurry when the request for reauthorization is made, the buffer period allows the user to wait until a more convenient time to reenter the PIN.

III. Process

Figure 3:
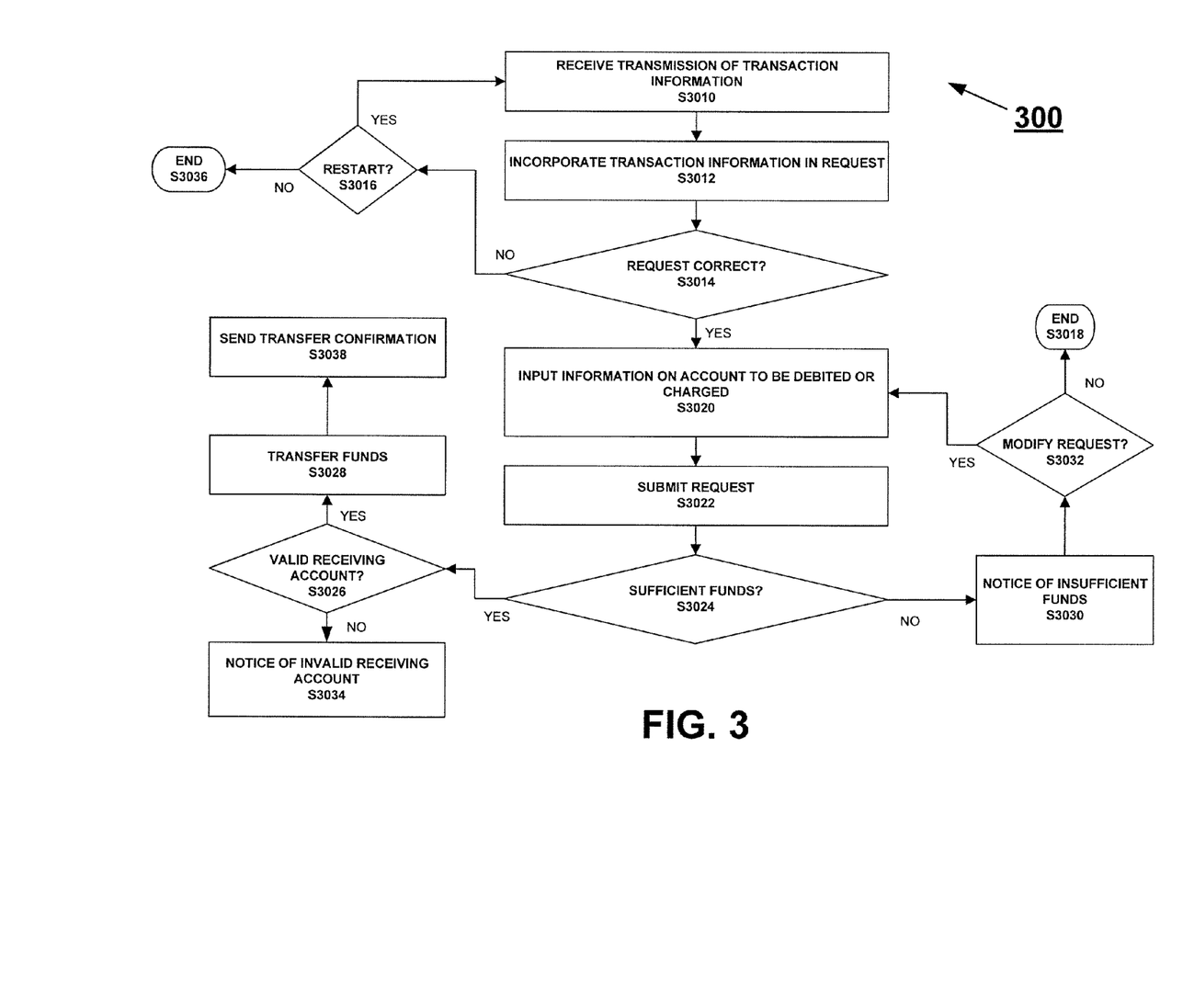
FIG. 3 shows a flowchart illustrating an exemplary person-to-person funds transfer process, according to an embodiment of the present invention.

Referring to FIG. 3, a flowchart illustrating a person-to-person funds transfer process 300, according to an embodiment of the present invention, is shown. Preferably, process 300 utilizes funds-transfer system 100. As discussed above, optional security measures (e.g., firewall, etc.) may be implemented prior to and/or concurrently with communication with server transfer server 102.

Process 300 begins after Person A and Person B agree to a transfer of funds. As discussed above, neither Person A nor Person B necessarily is a professional vendor. For example, Person B may agree to make a purchase from Person A at a garage sale or at a community fundraising event, or Person A may agree to repay a personal loan from Person B. There are, of course, many other situations in which process 300 would provide a convenient way to transfer funds from person to person.

At step S3010, Mobile Device B belonging to Person B receives transaction information transmitted from Mobile Device A belonging to Person A. The transaction information may include any combination of the following: an amount to be transferred; a payee or recipient name (e.g., Person A's name); information identifying a financial transaction account into which the amount is to be transferred (e.g., an account number); an access code for accessing the financial transaction account; an account-holder name of the financial transaction account; and contact information for providing a transfer confirmation (e.g., a call number for Mobile Device A, an email address, and the like). Preferably, the transaction information includes at least the amount to be transferred and the information for identifying the financial transaction account that is to receive the transferred amount. The transaction information may be transmitted according to known transmission techniques, such as by a "line-of-sight" infrared beam from Mobile Device A to Mobile Device B, by a standard text message, by a Bluetooth® transmission, or the like.

At step S3012, a funds-transfer application stored in Mobile Device B incorporates the received transaction information in a funds-transfer request, which is an electronic request generated by the funds-transfer application. Optionally, for security purposes, the received information may be incorporated into the funds-transfer request in such a manner that sensitive information is not visible. For example, the amount to be transferred and the payee or recipient name may be visible, but the account number and the access code may not be visible. Also optionally, for security purposes, the received transaction information is usable only for a current funds-transfer transaction and may not be stored in Mobile Device B for future use.

The fund-transfer application prompts Person B to review the funds-transfer request. At step S3014, if Person B disagrees with information in the fund-transfer request (e.g., if there is a disagreement with the amount to be transferred), process 300 proceeds to step S3016 at which Person B either ends the funds-transfer transaction at step S3018 or re-starts the funds-transfer transaction by asking Person A to re-transmit the transaction information with the desired correction (e.g., with a corrected amount to be transferred) and returning to step S3010.

At step S3020, Person B inputs information identifying a financial transaction account from which the amount to be transferred is obtained. For example, Person B may opt to use a default financial transaction account for which the funds-transfer application utilizes pre-stored information. If Person B opts to use a different financial transaction account, the funds-transfer application prompts Person B to input information necessary to identify and access that financial transaction account. Optionally, the funds-transfer request may include authentication information, which is used to authenticate Person B. For example, the authentication information may be biometric information, a digital signature, a password, or any other information that can be used to authenticate the buyer.

At step S3022, Person B submits the funds-transfer request to a transfer server (e.g., transfer server 102). At step S3024, the transfer server accesses the financial transaction account identified by Person B and determines whether sufficient funds are present to cover the amount to be transferred. If so, process 300 proceeds to step S3026, at which the transfer server determines whether the financial transaction account identified by Person A (i.e., the receiving account) is a valid account. If so, the amount is debited from the financial transaction account identified by Person B and credited to the financial transaction account identified by Person A, at step S3028. If not, a notice is transmitted, stating that the financial transaction account identified by Person A is invalid as the receiving account, at step S3034. The notice may be sent to one or both of Mobile Device A and Mobile Device B. Subsequently, process 300 may end or may return to step S3014, at which a corrected receiving account may be identified.

If, at step S3024, it is determined that there are insufficient funds in the financial transaction account identified by Person B, then a notification regarding the insufficient funds is transmitted to Mobile Device B, at step S3030. Optionally, at step S3032, the notification may include an option for Person B to modify the funds-transfer request to identify a different financial transaction account from which to obtain the amount to be transferred. If Person B selects this option, process 300 returns to step S3020. If Person B declines this option, process 300 ends at step S3036.

At step S3038, once the financial transaction account identified by Person A has been credited, a transfer confirmation is transmitted to Person A. For example, the transfer confirmation may be a text message to Mobile Device A and/or an email message transmitted according to contact information provided by Person A in the transaction information.

Optionally, at step S3038, a transfer confirmation also is transmitted to Person B. For example, the transfer confirmation may be a text message to Mobile Device B and/or an email message transmitted to a pre-set email address, which is automatically included in the funds-transfer request by the funds-transfer application stored in Mobile Device B.

Although process 300 shown in FIG. 3 describes an embodiment in which Person A (i.e., the payer) submits the funds-transfer request, persons skilled in the art of financial transactions will readily appreciate that the scope of the present invention also includes an embodiment in which Person B (i.e., the payee) submits the funds-transfer request and Person A transmits the transaction information to Mobile Device B.

The financial transaction accounts may be savings accounts, checking accounts, credit-card accounts, and the like. For example, a payer may choose to use a financial transaction account that is a credit-card account, whereas a payee may choose to use a financial transaction account that is a savings account.

If the two financial transaction accounts involved in the funds-transfer transaction are with the same financial institution (e.g., both financial transaction accounts are with Bank X), then the transfer may occur immediately. That is, the payee may be able to use the transferred funds immediately. If, however, the two financial transaction accounts involved in the funds-transfer transaction are with different financial institutions (e.g., one account is with Bank X and another account is with Bank Y), then the transferred funds may not be available for immediate use by the payee, but may be subject to a settlement process between the different financial institutions.

According to an embodiment of the present invention, at step S3038, if the funds-transfer transaction involve the same financial institution, then the transfer confirmation may include an optional message that the transferred funds are available for immediate use; if the funds-transfer transaction involve different financial institutions, then the transfer confirmation may include an optional message that the transferred funds are subject to a settlement procedure before being available for use.

As will be appreciated by those of skill in the relevant art(s), the order of steps in process 300 need not be as shown in FIG. 3, and some steps may occur in parallel or in another order.

IV. Exemplary Implementation(s)

The present invention (i.e., funds-transfer systems 100, application installation system 200, or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 4:
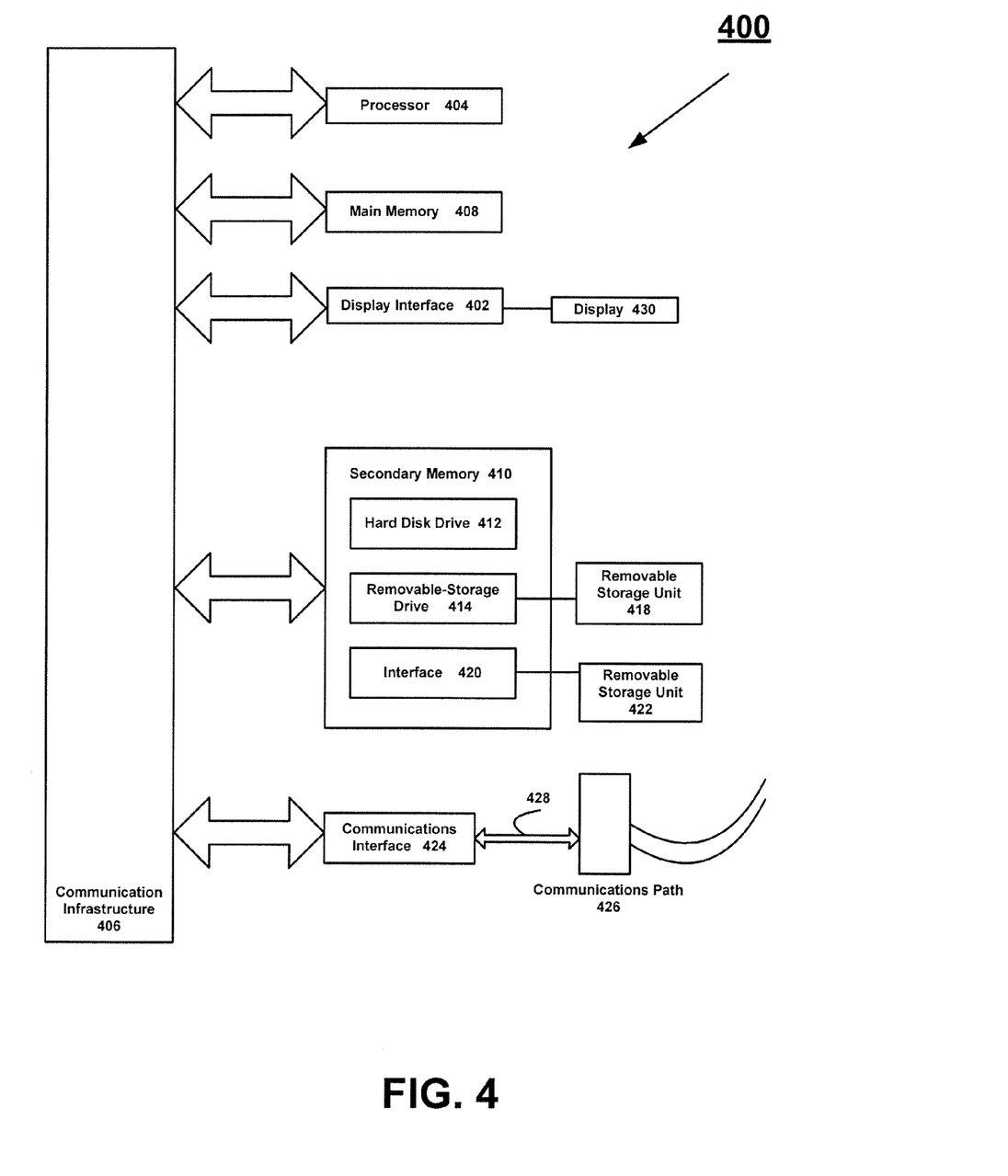
FIG. 4 shows a block diagram of an exemplary computer system useful for implementing an aspect of the present invention.

In an embodiment of the present invention, one or more computer systems are equipped to carry out the functions described herein. An example of such a computer system 400 is shown in FIG. 4.

Computer system 400 includes at least one processor 404. Processor 404 is connected to a communication infrastructure 406 (e.g., a communications bus, a cross-over bar device, or a network). Although various software embodiments are described herein in terms of this exemplary computer system 400, after reading this description, it will become apparent to a person skilled in the relevant art(s) how to implement the invention using other computer systems and/or architectures.

Computer system 400 includes a display interface 402 that forwards graphics, text, and other data from communication infrastructure 406 (or from a frame buffer (not shown)) for display on a display unit 430.

Computer system 400 also includes a main memory 408, which preferably is a random access memory (RAM), and may also include a secondary memory 410. Secondary memory 410 may include, for example, a hard disk drive 412 and/or a removable-storage drive 414 (e.g., a floppy disk drive, a magnetic tape drive, an optical disk drive, and the like). Removable-storage drive 414 reads from and/or writes to a removable storage unit 418 in a well-known manner. Removable storage unit 418 may be, for example, a floppy disk, a magnetic tape, an optical disk, and the like, which is written to and read by removable-storage drive 414. As will be appreciated, removable storage unit 418 includes a computer-usable storage medium having stored therein computer software and/or data.

In alternative embodiments, secondary memory 410 may include other similar devices for allowing computer programs or other instructions to be loaded into computer system 400. Such devices may include a removable storage unit 422 and an interface 420 (e.g., a program cartridge and a cartridge interface similar to those used with video game systems), a removable memory chip (e.g., an erasable programmable read-only memory ("EPROM"), or a programmable read-only memory ("PROM")) and an associated memory socket, and other removable storage units 422 and interfaces 420 that allow software and data to be transferred from removable storage unit 422 to computer system 400.

Computer system 400 may also include a communications interface 424, which allows software and data to be transferred between computer system 400 and external devices (not shown). Examples of communications interface 424 may include a modem, a network interface (e.g., an Ethernet card), a communications port, a Personal Computer Memory Card International Association ("PCMCIA") interface, and the like. Software and data transferred via communications interface 424 are in the form of signals 428, which may be electronic, electromagnetic, optical or another type of signal that is capable of being received by communications interface 424. Signals 428 are provided to communications interface 424 via a communications path 426 (e.g., a channel). Communications path 426 carries signals 428 and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 418 used with removable-storage drive 414, a hard disk installed in hard disk drive 412, and signals 428, for example. These computer program products provide software to computer system 400. The present invention may be implemented or embodied as one or more of such computer program products.

Computer programs (also referred to as computer control logic) are stored in main memory 408 and/or secondary memory 410. The computer programs may also be received via communications interface 424. Such computer programs, when executed, enable computer system 400 to perform the features of the present invention, as discussed herein. In particular, the computer programs, when executed, enable the processor 404 to perform the features of the present invention. Accordingly, such computer programs represent controllers of computer system 400.

In an embodiment where the present invention is implemented using software, the software may be stored in a computer program product and loaded into computer system 400 using removable-storage drive 414, hard drive 412, or communications interface 424. The control logic (software), when executed by processor 404, causes processor 404 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

As will be appreciated by those of skill in the relevant art(s), the present invention may be implemented using a single computer or using a computer system that includes multiple computers each programmed with control logic to perform various of the above-described functions of the present invention.

V. Conclusion

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A non-transitory computer program product having computer-executable instructions stored thereon that, in response to execution by a computer-based system for enabling a buyer to transfer funds to a seller via mobile telephones, cause the computer-based system to perform operations comprising:

receiving, by the computer-based system, a funds-transfer request transmitted from a mobile telephone of the seller,
   wherein the funds-transfer request is for a transfer of funds from a financial account held by the buyer to a financial account held by the seller,
   wherein the funds-transfer request is transmitted from a payment application stored in the seller's mobile telephone,
   wherein the payment application is uploaded to the seller's mobile telephone when the computer receives a request from the seller's mobile telephone, and
   wherein the funds-transfer request identifies a purchase amount to be transferred, and information identifying the financial account held by the seller;
processing, by the computer-based system, the funds-transfer request according to the purchase amount and the received financial account information;
providing, by the computer-based system, an insufficient fund notification to the mobile telephone of the buyer in response to the financial account having insufficient funds to complete the transfer of funds;
requesting, by the computer-based system, the buyer modify the funds-transfer request via the mobile telephone of the buyer to identify a different financial account in response to the financial account having insufficient funds to complete the transfer of funds;
providing, by the computer-based system, an invalid account notification to both the mobile telephone of the buyer and the mobile telephone of the seller, in response to the received financial account information being invalid;
providing, by the computer-based system, a notification to the mobile telephone of the buyer to modify the funds-transfer request;
requesting, by the computer-based system, that the buyer modify the funds-transfer request via the mobile telephone to identify a valid financial account, in response to the received financial account information corresponding to an invalid financial account;
charging, by the computer-based system, the purchase amount to one of the financial account or the valid financial account held by the buyer and to transfer the purchase amount to a financial account held by the seller; and
providing, by the computer-based system, a payment acknowledgment to the buyer's mobile telephone and to the seller's mobile telephone.

2. The non-transitory computer program product of claim 1, wherein the information identifying the financial account held by the seller is transmitted from the seller's mobile telephone to the buyer's mobile telephone.

3. The non-transitory computer program product of claim 1,
   wherein the information identifying the financial account held by the seller includes a telephone number of the seller's mobile telephone, and
   wherein the payment acknowledgment is a text message sent to the seller's mobile telephone.

4. The non-transitory computer program product of claim 1, wherein the funds-transfer request includes authentication information used to authenticate the seller.

5. A non-transitory computer program product having computer-executable instructions stored thereon that, in response to execution by a computer-based system for enabling funds to be transferred between a first party and a second party via mobile devices, cause the computer-based system to perform operations comprising:
   receiving, by the computer-based system, a request transmitted from a mobile device of the first party,
      wherein the request is for a transfer of funds to a financial account held by the first party from a financial account held by the second party,
      wherein the request is transmitted from a payment application stored in the first party's mobile device,
      wherein the payment application is uploaded to the first party's mobile device when the computer receives a request from the first party's mobile device, and
      wherein the request identifies a purchase amount to be transferred, information identifying the financial account of the first party, and information identifying the financial account of the second party;
   processing, by the computer-based system, the request according to the purchase amount and the financial account of the first party;
   providing, by the computer-based system, an insufficient fund notification to the first party's mobile device in response to the financial account of the first party having insufficient funds to complete the transfer of funds;
   requesting, by the computer-based system, the first party modify the request to identify a different financial account via the mobile device of the first party in response to the financial account of the first party having insufficient funds to complete the transfer of funds;
   providing, by the computer-based system, an invalid account notification to both the mobile device of the first party and mobile device of the second party, in response to the financial account information being invalid;
   providing, by the computer-based system, a notification to the mobile device of the first party to modify the funds-transfer request;
   requesting, by the computer-based system, that the first party modify the funds-transfer request via the mobile device to identify a valid financial account, in response to the received financial account information corresponding to an invalid financial account;
   transferring, by the computer-based system, the purchase amount between one of the financial account and the valid financial account held by the first party and the financial account held by the second party; and
   providing, by the computer-based system, a payment acknowledgment to the first party's mobile device and to the second party's mobile device.

6. The non-transitory computer program product of claim 5, wherein the first party's mobile device is a mobile telephone or a wireless email device.

7. The non-transitory computer program product of claim 5,
   wherein the mobile device of the second party is a mobile telephone or a wireless email device, and
   wherein the information identifying the financial account of the second party is transmitted from the second party's mobile device to the first party's mobile device.

8. The non-transitory computer program product of claim 5, wherein the first party is a payer and the second party is a payee.

9. The non-transitory computer program product of claim 5, wherein the first party is a payee and the second party is a payer.

10. A non-transitory computer-readable medium having control logic stored therein, which in response to execution by a computer program product for enabling a buyer to transfer funds to a seller via mobile telephones cause the computer program product to perform operations comprising:

uploading, by the computer program product, a payment application to a mobile telephone of the seller upon an upload request transmitted from the seller's mobile telephone to the computer,
wherein the uploaded payment application is personalized for the seller in accordance with identification information transmitted from the seller's mobile telephone to the computer, and
wherein the uploaded payment application is stored in a memory of the seller's mobile telephone;

receiving, by the computer program product, a funds-transfer request transmitted from the seller's mobile telephone,
wherein the funds-transfer request is for a transfer of funds from a financial account held by the buyer to a financial account held by a seller, and
wherein the funds-transfer request is transmitted in accordance with the payment application and identifies a purchase amount to be transferred, a telephone number for a mobile telephone of the buyer and information identifying the financial account held by the seller;

processing, by the computer program product, the funds-transfer request according to the purchase amount and the financial account, wherein the computer provides an insufficient fund notification to the buyer's mobile telephone in response to the financial account having insufficient funds to complete the transfer of funds, and wherein the computer provides an invalid financial account notification to both the mobile telephone of the buyer and mobile telephone of the seller, in response to the financial account information corresponding to an invalid financial account, providing, by the computer program product, a notification to the mobile telephone of the buyer to modify the funds-transfer request;

requesting, by the computer program product, the buyer modify the funds-transfer request via the buyer's mobile telephone to identify a valid financial account in response to at least one of the financial account having insufficient funds to complete the transfer of funds and receipt of an invalid financial account notification;

charging, by the computer program product, the purchase amount to one of the financial account or the different financial account held by the buyer and to transfer the purchase amount to a financial account held by the seller; and providing, by the computer program product, a payment acknowledgment to each of the buyer's mobile telephone and the seller's mobile telephone.

11. The non-transitory computer-readable medium of claim 10, wherein the telephone number of the buyer's mobile telephone identifies the financial account held by the buyer.

12. The non-transitory computer-readable medium of claim 10, wherein the funds-transfer request identifies the financial account held by the buyer.

13. The non-transitory computer-readable medium of claim 10, wherein the telephone number of the buyer's mobile telephone is inputted to the payment application via a wireless transmission.

14. The non-transitory computer-readable medium of claim 10, wherein the telephone number of the buyer's mobile telephone is manually inputted to the payment application using a keypad of the seller's mobile telephone.

15. A non-transitory computer-readable medium having control logic stored therein, which in response to execution by a computer system for enabling a buyer to transfer funds to a seller via mobile telephones cause the computer system to perform operations comprising:

receiving, at the computer system, a funds-transfer request transmitted from a mobile telephone of the seller,
wherein the funds-transfer request is for a transfer of funds from a financial account held by the buyer to a financial account held by the seller,
wherein the funds-transfer request is transmitted from a payment application stored in the seller's mobile telephone,
wherein the payment application is uploaded to the seller's mobile telephone when the computer receives a request from the seller's mobile telephone, and
wherein the funds-transfer request identifies a purchase amount to be transferred, and information identifying the financial account held by the seller;

processing, by the computer system, the funds transfer request according to the purchase amount and the financial account, and wherein the computer provides an insufficient fund notification to the buyer's mobile telephone in response to the financial account having insufficient funds to complete the transfer of funds, and wherein the computer provides an invalid financial account notification to both the mobile telephone of the buyer and mobile telephone of the seller, in response to the financial account information corresponding to an invalid financial account;

providing, by the computer system, a notification to the mobile telephone of the buyer to modify the funds-transfer request;

requesting, by the computer system, the buyer modify via the buyer's mobile telephone the funds-transfer request to identify a valid financial account in response to at least one of the financial account having insufficient funds to complete the transfer of funds and receipt of an invalid financial account notification;

charging, by the computer system, the purchase amount to one of the financial account or the different financial account held by the buyer and to transfer the purchase amount to a financial account held by the seller; and providing, by the computer system, a payment acknowledgment to the buyer's mobile telephone and to the seller's mobile telephone.

16. The non-transitory computer-readable medium of claim 15, wherein the information identifying the financial account held by the seller is transmitted from the seller's mobile telephone to the buyer's mobile telephone.

17. The non-transitory computer-readable medium of claim 16, wherein the payment acknowledgment is provided to the seller's mobile telephone.

18. The non-transitory computer-readable medium of claim 15,
wherein the information identifying the financial account held by the seller includes a telephone number of the seller's mobile telephone, and
wherein the payment acknowledgment is a text message sent to the seller's mobile telephone.

19. The non-transitory computer-readable medium of claim 15, wherein the funds-transfer request includes authentication information used to authenticate the seller.

20. A computer system for enabling a buyer to transfer funds to a seller via mobile telephones comprising:
a network interface communicating with a memory;
the memory communicating with a processor for virtual mobile transactions; and
the processor, when executing a computer program, performs operations comprising:
receiving, at the processor, a request transmitted from a mobile device of the first party,
wherein the request is for a transfer of funds to a financial account held by the first party from a financial account held by the second party,
wherein the request is transmitted from a payment application stored in the first party's mobile device,
wherein the payment application is uploaded to the first party's mobile device when the computer receives a request from the first party's mobile device, and
wherein the request identifies a purchase amount to be transferred, information identifying the financial account of the first party, and information identifying the financial account of the second party;
process, by the processor, the funds-transfer request according to the purchase amount and the financial account, and wherein the computer provides an insufficient fund notification to the buyer's mobile telephone in response to the financial account having insufficient funds to complete the transfer of funds, and wherein the computer provides an invalid account notification to both the mobile telephone of the buyer and mobile telephone of the seller, in response to the financial account information corresponding to an invalid financial account;
providing, by the processor, a notification to the mobile telephone of the buyer to modify the funds-transfer request;
request, by the processor, the buyer modify via the buyer's mobile telephone the funds-transfer request to identify a valid financial account in response to at least one of the financial account having insufficient funds to complete the transfer of funds and receipt of an invalid financial account notification;
transferring, by the processor, the purchase amount between one of the financial account or the different financial account held by the first party and the financial account held by the second party; and
providing, by the processor, a payment acknowledgment to the first party's mobile device and to the second party's mobile device.

21. The computer system of claim 20, wherein the first party's mobile device is a mobile telephone or a wireless email device.

22. The computer system of claim 20,
wherein the communication device of the second party is a mobile telephone or a wireless email device, and
wherein the information identifying the financial account of the second party is transmitted from the second party's communication device to the first party's mobile device.

23. The computer system of claim 20, wherein the first party is a payer and the second party is a payee.

24. The computer system of claim 20, wherein the first party is a payee and the second party is a payer.

25. The computer system of claim 20, wherein the payment application is uploaded to the first party's mobile device when the computer receives a request from the first party's mobile device.

26. A system for enabling a buyer to transfer funds to a seller via mobile telephones comprising:
a network interface communicating with a memory;
the memory communicating with a processor for virtual mobile transactions; and
the processor, when executing a computer program, performs operations comprising:
downloading, by the processor, a payment application to a mobile telephone of the seller upon a download request transmitted from the seller's mobile telephone to the system,
wherein the downloaded payment application is personalized for the buyer in accordance with identification information transmitted from the seller's mobile telephone to the system, and
wherein the downloaded payment application is stored in a memory of the seller's mobile telephone;
receiving, by the processor, a funds-transfer request transmitted from the seller's mobile telephone,
wherein the funds-transfer request is for a transfer of funds from a financial account held by the buyer to a financial account held by the seller, and
wherein the funds-transfer request is transmitted in accordance with the payment application and identifies a purchase amount to be transferred, a telephone number for a mobile telephone of the buyer, and information identifying the financial account held by the seller;
processing, by the processor, the funds-transfer request according to the purchase amount and the financial account, and wherein the system provides an insufficient fund notification to the buyer's mobile telephone in response to the financial account having insufficient funds to complete the transfer of funds, and wherein the computer provides an invalid account notification to both the mobile device of the buyer and mobile device of the seller, in response to the financial account information corresponding to an invalid financial account;
providing, by the processor, a notification to the mobile telephone of the buyer to modify the funds-transfer request;
requesting, by the processor, the buyer modify via the buyer's mobile telephone the funds-transfer request to identify a valid financial account in response to at least one of the financial account having insufficient funds to complete the transfer of funds and receipt of an invalid financial account notification;
charging, by the processor, the purchase amount to the financial account held by the buyer and to transfer the purchase amount to a financial account held by the seller; and
providing, by the processor, a payment acknowledgment to each of the buyer's mobile telephone and the seller's mobile telephone.

27. The system of claim 26, wherein the telephone number of the buyer's mobile telephone identifies the financial account held by the buyer.

28. The system of claim 26, wherein the funds-transfer request identifies the financial account held by the buyer.

29. The system of claim 26, wherein the telephone number of the buyer's mobile telephone is inputted to the payment application via a wireless transmission.

30. The system of claim 26, wherein the telephone number of the buyer's mobile telephone is manually inputted to the payment application using a keypad of the seller's mobile telephone.

31. A method comprising:

receiving, by a computer-based system configured for a buyer to transfer funds to a seller via mobile telephones, a funds-transfer request transmitted from a mobile telephone of the seller,
- wherein the funds-transfer request is for a transfer of funds from a financial account held by the buyer to a financial account held by the seller,
- wherein the funds-transfer request is transmitted from a payment application stored in the seller's mobile telephone,
- wherein the payment application is uploaded to the seller's mobile telephone upon a download request transmitted from the seller's mobile telephone to a computer system, and
- wherein the funds-transfer request identifies a purchase amount to be transferred, and information identifying the financial account held by the seller;

processing, by the computer-based system, the funds-transfer request according to the purchase amount and the financial account held by the buyer;

providing, by the computer-based system, an insufficient fund notification to the buyer's mobile telephone in response to the financial account of the buyer having insufficient funds to complete the transfer of funds;

providing, by the computer-based system, an invalid account notification to both the buyer's mobile telephone and the sellers mobile telephone, in response to the financial account information corresponding to an invalid financial account;

providing, by the computer-based system, a notification to the mobile telephone of the buyer to modify the funds-transfer request;

requesting, by the computer-based system, the buyer modify via the buyer's mobile telephone the funds-transfer request to identify a valid financial account in response to at least one of the financial account of the buyer having insufficient funds to complete the transfer of funds and receipt of an invalid financial account notification;

charging, by the computer-based system, the purchase amount to one of the financial account or the different financial account held by the buyer;

transferring, by the computer-based system, the purchase amount to a financial account held by the seller; and providing, by the computer-based system, a payment acknowledgment to the buyer's mobile telephone and to the seller's mobile telephone.

32. A method comprising:

receiving, by a computer-based system configured for funds to be transferred between a first party and a second party via mobile devices, a request transmitted from a mobile device of the first party,
- wherein the request is for a transfer of funds to a financial account held by the first party from a financial account held by the second party,
- wherein the request is transmitted from a payment application stored in the first party's mobile device,
- wherein the payment application is uploaded to the first party's mobile device upon a download request transmitted from the first party's mobile device to a computer system, and
- wherein the request identifies a purchase amount to be transferred, information identifying the financial account of the first party, and information identifying the financial account of the second party;

processing, by the computer-based system, the request according to the purchase amount and the financial account of the second party;

providing, by the computer-based system, an insufficient fund notification to the second party mobile device in response to the financial account of the second party having insufficient funds to complete the transfer of funds;

providing, by the computer-based system, an invalid account notification to both the buyer's mobile telephone and the sellers mobile telephone, in response to the financial account information corresponding to an invalid financial account;

providing, by the computer-based system, a notification to the mobile device of the second party to modify the funds-transfer request;

requesting, by the computer-based system, the second party modify via the second party mobile device the request to identify a valid financial account in response to at least one of the financial account of the second party having insufficient funds to complete the transfer of funds and receipt of an invalid financial account notification;

transferring, by the computer-based system, the purchase amount between the financial account held by the first party and one of the financial account or the different financial account held by the second party; and providing, by the computer-based system, a payment acknowledgment to the first party's mobile device and to the second party's mobile device.

33. A method comprising:

uploading, by a computer-based system configured for a buyer to transfer funds to a seller via mobile telephones, a payment application to a mobile telephone of the seller upon an upload request transmitted from the seller's mobile telephone to the computer,
- wherein the uploaded payment application is personalized for the seller in accordance with identification information transmitted from the seller's mobile telephone to the computer, and
- wherein the uploaded payment application is stored in a memory of the seller's mobile telephone;

receiving, by the computer-based system, a funds-transfer request transmitted from the seller's mobile telephone,
- wherein the funds-transfer request is for a transfer of funds from a financial account held by the buyer to a financial account held by the seller, and
- wherein the funds-transfer request is transmitted in accordance with the payment application and identifies a purchase amount to be transferred, a telephone number for a mobile telephone of the buyer and information identifying the financial account held by the seller;

processing, by the computer-based system, the funds-transfer request according to the purchase amount and the financial account of the buyer;

providing, by the computer-based system, an insufficient fund notification to the buyer's mobile telephone in response to the financial account of the buyer having insufficient funds to complete the transfer of funds;

providing, by the computer-based system, an invalid account notification to both the buyer's mobile telephone and the sellers mobile telephone, in response to the financial account being invalid;

providing, by the computer system, a notification to the mobile telephone of the buyer to modify the funds-transfer request;

requesting, by the computer-based system, the buyer modify via the buyer's mobile telephone the funds-transfer request to identify a valid financial account in response to at least one of the financial account of the buyer having insufficient funds to complete the transfer of funds and receipt of an invalid financial account notification;

charging, by the computer-based system, the purchase amount to the financial account held by the buyer;

transferring, by the computer-based system, the purchase amount to a financial account held by the seller; and providing, by the computer-based system, a payment acknowledgment to each of the buyer's mobile telephone and the seller's mobile telephone.

* * * * *